US006268973B1

United States Patent
Bickers

(10) Patent No.: US 6,268,973 B1
(45) Date of Patent: Jul. 31, 2001

(54) GENERATING APPENDABLE POINTS IN ENCODED DATA

(75) Inventor: Richard Arthur Bickers, Bristol (GB)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/182,306

(22) Filed: Oct. 30, 1998

(30) Foreign Application Priority Data

Oct. 31, 1997 (EP) .................................................. 97308779

(51) Int. Cl.[7] ....................................................... G11B 5/09
(52) U.S. Cl. ................................ 360/48; 360/53; 714/748
(58) Field of Search .......................... 360/48, 53; 714/18, 714/701, 748

(56) References Cited

U.S. PATENT DOCUMENTS

| 5,247,396 | 9/1993 | Ytaka et al. |
| 5,485,321 | * 1/1996 | Leonhardt et al. .................... 360/61 |
| 5,754,754 | * 5/1998 | Dudley et al. ........................ 714/18 |

FOREIGN PATENT DOCUMENTS

| 0324542A | 7/1989 | (EP) . |
| 0338781A | 10/1989 | (EP) . |
| 0459041A | 12/1991 | (EP) . |
| WO9110999A | 7/1991 | (WO) . |

OTHER PUBLICATIONS

J. Tierney, "Data Compression Cuts Data Redundancy", Computer Technology Review, vol. 10, No. 13, p. 26, Nov. 1, 1990.

M. Frank, 'DCLZ Emerges as an Open Data Compression Standard Computer Technology Review, vol. 11, No. 9, Jul. 1, 1991.

* cited by examiner

Primary Examiner—Alan T. Faber

(57) ABSTRACT

In a tape drive, a host interface receives from a host computer host data to be compressed and stored to tape. The host interface and also receives commands to create appendable points in the resulting compressed data stream. A data formatter formats the received host data by encoding the data as codewords to form the compressed data stream, and co-operates with the host interface by inserting into the compressed data stream special flush codewords at the requested appendable points. The formatter is also provided with the ability to insert flush codewords at positions determined by the host interface itself. The codeword that follows a flush codeword is located at a pre-determined position relative to and after the flush codeword. Thus, appendable points are locatable by their respective flush codewords in the compressed data stream.

28 Claims, 11 Drawing Sheets

INDEX - GROUP 1

| BAT |
|---|
| ENTRY 1 (R1) |
| ENTRY 2 (FM) |
| ENTRY 3 (R2) |
| ENTRY 4 (FM) |
| ENTRY 5 (R3) |

| GIT |
|---|
| BAT ENTRY (5) |
| FMC (2) |
| RC (5) |

INDEX - GROUP 2

| BAT |
|---|
| ENTRY 1 (R3) |
| ENTRY 2 (R4) |
| ENTRY 3 (R5) |
| ENTRY 4 (FM) |

| GIT |
|---|
| BAT ENTRY (4) |
| FMC (3) |
| RC (5) |

Figure 2

| Codeword | Value | Flush |
|---|---|---|
| Reset 1 | 1b + FFh + 0h | No |
| Reset 2 | 1b + FFh + 1h | No |
| Scheme 1 | 1b + FFh + 2h | No |
| Scheme 2 | 1b + FFh + 3h | No |
| File Mark | 1b + FFh + 4h | Yes |
| End of Record | 1b + FFh + 5h | Yes |
| Flush | 1b + FFh + 6h | Yes |
| ⋮ | ⋮ | ⋮ |
| ⋮ | ⋮ | ⋮ |
| End Marker | 1b + FFh + Fh | Yes |

Figure 6

| Byte Position | Length | Name |
|---|---|---|
| 0 | 4 | Data Set Number |
| 4 | 4 | Valid Data Length |
| 8 | 4 | Access Point Offset |
| 12 | 6 | Total Records |
| 18 | 6 | Total File Marks |
| 24 | 4 | Record Count |
| 28 | 4 | File Mark Count |
| 32 | 4 | Partial Record Length |

Figure 7

| Match Count Field | Number of Bytes |
|---|---|
| 00 | 2 |
| 01 | 3 |
| 1000 | 4 |
| ⋮ | ⋮ |
| ⋮ | ⋮ |
| 1011 | 7 |
| 110 000 | 8 |
| ⋮ | ⋮ |
| ⋮ | ⋮ |
| 110 111 | 15 |
| 1110 0000 | 16 |
| ⋮ | ⋮ |
| ⋮ | ⋮ |
| 1110 1111 | 31 |
| 1111 0000 0000 | 32 |
| ⋮ | ⋮ |
| ⋮ | ⋮ |
| 1111 1110 1110 | 270 |
| 1111 1110 1111 | 271 |
| 1111 1111 0000 | reserved |
| ⋮ | ⋮ |
| ⋮ | ⋮ |
| 1111 1111 1111 | reserved |

Figure 12

GENERATING APPENDABLE POINTS IN ENCODED DATA

TECHNICAL FIELD

The present invention relates to data storage, and in particular, but not exclusively, to methods and apparatus for encoding or formatting data for storage to, for example, a magnetic medium such as tape.

BACKGROUND ART

Taking data storage to tape as an example, a host computer system typically writes data to a storage apparatus, such as a tape drive, on a per Record basis. Further, the host computer may separate the Records themselves using Record separators such as FILE MARKs or SET MARKs.

Typically, Records comprise user data, for example, the data which makes up wordprocessor documents, computer graphics pictures or data bases. In contrast, Record separators, such as FILE MARKs, are used by a host computer to indicate the end of one wordprocessor document and the beginning of the next. In other words, Record separators typically separate groups of related Records.

Generally, the host computer determines Record length, and the order in which the Records and the Record separators are received, and, typically, the storage apparatus has no control over this.

By way of example, the diagram in FIG. 1($a$) illustrates a logical sequence of user data and separators that an existing type of host computer might write to a tape storage apparatus. Specifically, the host computer supplies five fixed-length Records, R1 to R5, in addition to three FILE MARKs, which occur after R1, R2 and R5.

It is known for a storage apparatus such as a tape drive to receive host computer data, arrange the data Records into fixed-sized groups independently of the Record structure, and represent the Record structure, in terms of Record and FILE MARK position, in an index forming part of each group. Such a scheme forms the basis of the DDS (Digital Date Storage) data format standard for tape drives defined in ISO/IEC Standard 10777:1991 E. EP 0 324 542 describes one example of a DDS tape drive, which implements this scheme. Once the groups of data are formed, the tape drive stores the groups to tape, typically after applying some form of error detection/correction coding.

The diagram in FIG. 1($b$) illustrates the organisation into DDS groups of the host computer data shown in FIG. 1($a$). Typically, the host computer data Records are encoded or compressed to form a continuous encoded data stream in each group. FILE MARKs are intercepted by the tape drive, and information that describes the occurrence and position of the FILE MARKs in the encoded data stream is generated by the tape drive and stored in the index of the respective group. In the present example, Records R1, R2 and a part of Record R3 are compressed into an encoded data stream and are stored in the first group, and information specifying the existence and position in the encoded data stream of the records and the first and second FILE MARKs is stored in the index of the first group. Then, the remainder of Record R3, and Records R4 and R5, are compressed into a continuous encoded data stream and are stored in the second group, and information specifying the existence and position in the encoded data stream of the records and the third FILE MARK is stored in the index of the second group.

FIG. 2 illustrates very generally the form of the indexes for both groups shown in FIG. 1($b$). As shown, each index comprises two main data structures, namely a block access table (BAT) and a group information table (GIT). The number of entries in the BAT is stored in a BAT entry field in the GIT. The GIT also contains various counts, such as a FILE MARK count (FMC) which is the number of FMs written since the beginning of Recording (BOR) mark, including any contained in the current group, and Record count (RC), which is the number of Records written since the beginning of Recording (BOR) mark, including any contained in the current group. The values for the entries in this simple example are shown in parentheses. The GIT may contain other information such as the respective numbers of FILE MARKs and Records which occur in the current group only.

The BAT describes, by way of a series of entries, the 'structure' of a group in terms of the logical segmentation of the Record data held in the group and the position of each separator mark. The access entries in the BAT follow in the order of the contents of the group, and the BAT itself grows from the end of the group inwardly to meet the encoded data stream of the Record data.

In such a scheme, a tape drive reading the stored data, on the basis of a command from a host computer to read or write data, relies on information in the index to locate the particular Record or FILE MARK starting position in the encoded data stream.

DISCLOSURE OF THE INVENTION

In accordance with a first aspect, the present invention provides a method of arranging data received from a data source, the method including the steps of:

receiving data from the data source, the data having a data structure determined by the data source;

determining an appendable point in the data, which point is determined independently of the data structure;

encoding the data from the data source into an encoded data stream and inserting into the encoded data stream data representative of the appendable point; and writing the data stream to a storage device or medium.

The present invention provides a means of encoding data received from a data source in such a way that any desired point, an 'appendable point', can be located in the resulting encoded or compressed data stream, irrespective of whether the point coincides with a Record boundary or a FILE MARK.

The applicant's co-pending patent application "Data Encoding Method and Apparatus" (applicant's reference 30970017), U.S. Pat. Ser. No. 09/182,308 filed Oct. 30, 1998, describes an invention wherein the requirement for a BAT is removed by embedding special, reserved codewords representing Record boundaries and Record separators, such as FILE MARKS, into the encoded data stream. Therein, Record boundaries and FILE MARKS can be located by the respective embedded codewords. The problem addressed herein relates to encoding data such that any required position can be located within the encoded data, in particular when the encoded data is compressed. The present invention is believed to be particularly advantageous when used in combination with the applicant's co-pending application.

In a preferred embodiment of the present invention, data from the data source is received in bursts or packets, and the beginning or end of each burst or packet is determined to be an appendable point. This is particularly advantageous for burst processing purposes, as will be described below.

In accordance with a second aspect, the present invention provides apparatus for arranging data received from a data source, the apparatus comprising:

interface means to receive data from the data source, the data having a data structure determined by the data source, and to determine an appendable point in the data, which point is determined independently of the data structure; and encoder means to encode the data from the data source into an encoded data stream and insert into the encoded data stream data representative of the appendable point and to write the data stream to a storage device or medium.

While this present invention finds particular application in the field of tape storage, the method may equally be applied to other storage devices and storage media. One alternative storage media would be optical disk. Also, it is anticipated that data may be received from sources other than a host computer, for example a data mover system, which moves data between storage devices.

Other aspects and embodiments of the present invention will become apparent from the following detailed description and claims.

BRIEF DESCRIPTION OF THE DRAWINGS

An embodiment of the present invention will now be described, by way of example only, with reference to the drawings, of which:

FIG. 2 is a diagram which illustrates in a more detailed fashion the type of data which is stored in an index of a data group of FIG. 1b;

FIG. 6 is a table of reserved codewords as defined in accordance with an embodiment of the present invention;

FIG. 7 is a table of data set information table entries as defined in accordance with an embodiment of the present invention;

FIG. 12 is a table illustrating the encoding scheme used for match field data in the data compression scheme used in the specific embodiment.

BEST MODE FOR CARRYING OUT THE INVENTION, & INDUSTRIAL APPLICABILITY

The present embodiment is based on a new data format for arranging data received by a tape drive for subsequent storing to tape. The format will now be described in detail.

Format Overview

Figure 4:
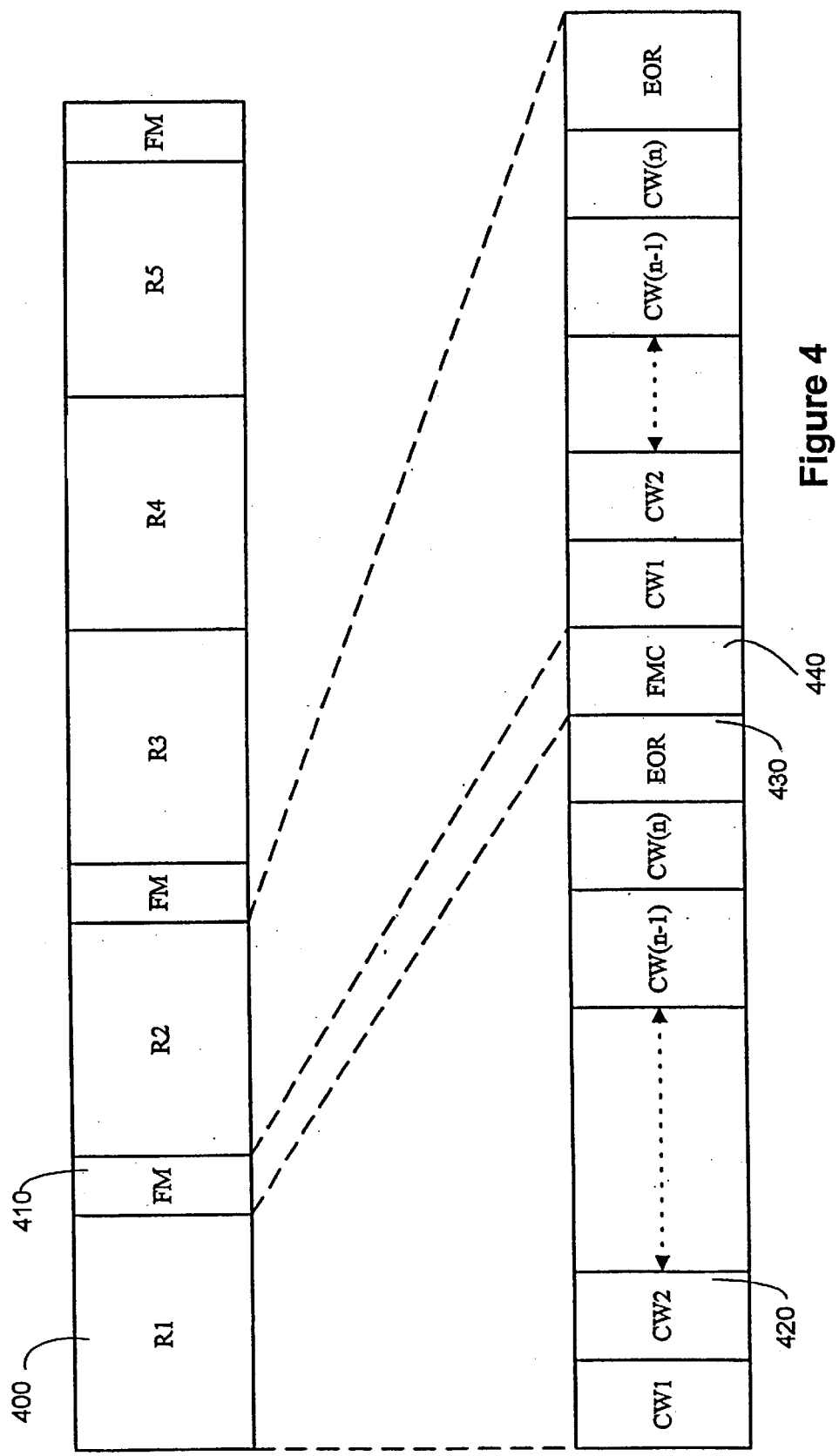
FIG. 4 is a diagram which illustrates the general form of data encoded in accordance with an embodiment of the present invention.

As illustrated in the diagram in FIG. 4, the smallest collection of data defined in the format, to be written by a host computer to a tape drive, is a Record 400. A Record 400 can be supplied by the host computer for processing by the tape drive, and can be reprocessed and made available to the host computer by the tape drive. The concept of a Record being the smallest collection of data 'written' by the host computer should not be confused, however, with the mechanism by which the data is actually 'transferred' or 'transported' between the host computer and the tape drive. Such mechanisms, typically utilise an underlying protocol, for example SCSI (Small Computer System Interface), which transfers data in a well-defined (or negotiated) way in terms of relatively small packets or bursts without regard to the nature or structure of the host data. A protocol such as SCSI validates each packet or burst before accepting a subsequent packet or burst.

The present format supports FILE MARKs 410, which may be written to the tape drive by the host computer in the form of Write FILE MARK commands.

Also, the present format specifies that the data in each Record 400 are encoded, where possible by a data compression (DC) algorithm, into a continuous (compressed) series of data codewords (CW), generally labelled 420 in FIG. 4.

A key difference between the present format and previous known formats is that both Record boundaries and FILE MARKs are encoded as symbols, or reserved codewords, and embedded into the continuous (compressed) encoded data stream. In contrast with other formats, for example DDS, this allows an encoded or compressed data stream to be decoded back into a serial stream of Records and Write FILE MARK commands without reference to any separately recorded or transmitted table or index. In FIG. 4, reserved End of Record (EOR) codewords are labelled 430 and reserved FILE MARK codewords (FMCs) are labelled 440.

In accordance with the format, although not an essential part of the present invention, the encoded data stream (including data and reserved codewords) is further arranged into data set form, as will be described below. Subsequently, the data is written to tape, in the process of which redundancy, in the form of well-known error detection and correction coding, for example Reed-Solomon coding, may be applied.

DATA SETS

Figure 5:
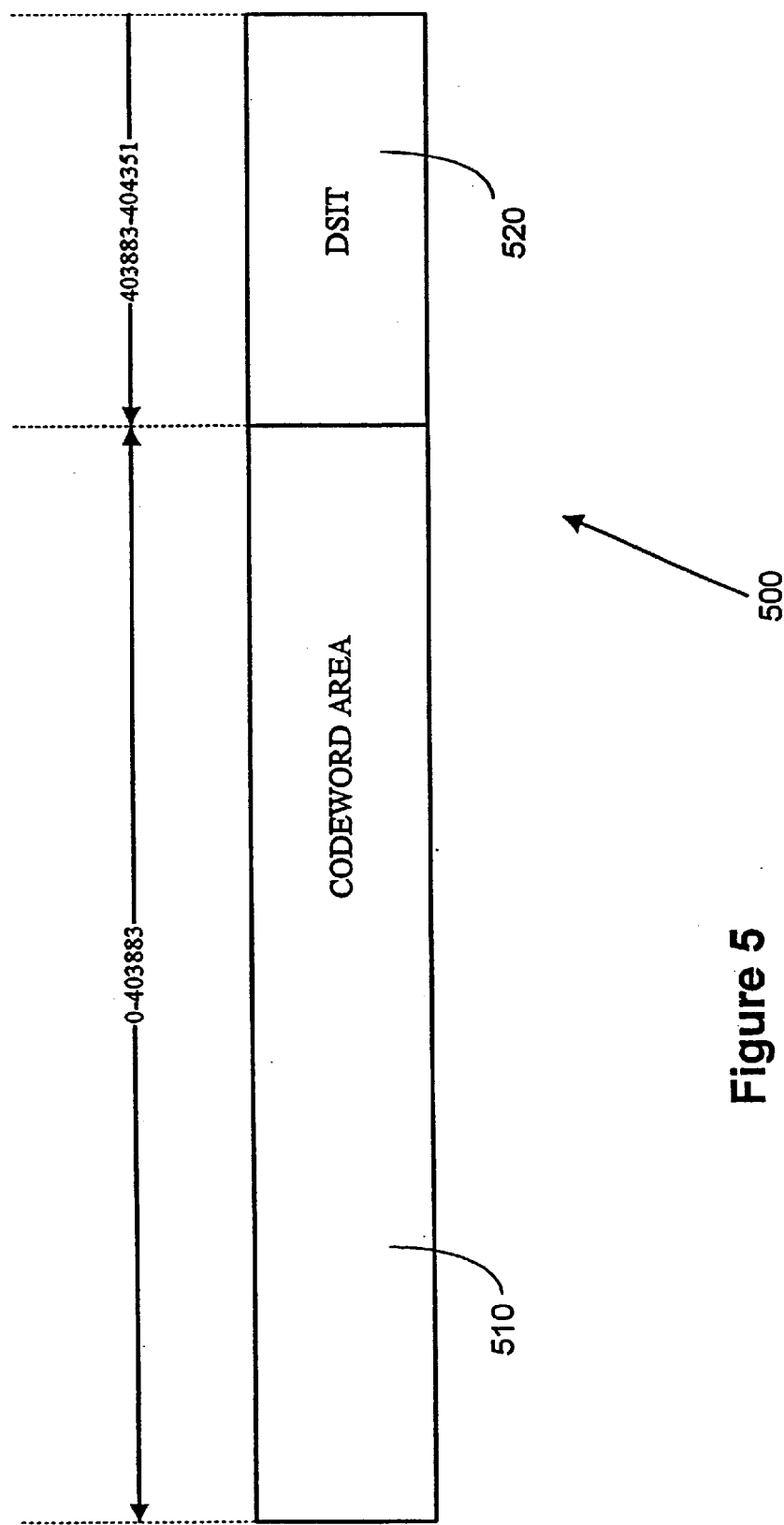
FIG. 5 is a diagram which illustrates the general form of a data set as defined in accordance with an embodiment of the present invention.

The codewords are arranged in data sets consisting of 404,352 bytes of data, as shown in the diagram in FIG. 5. Each data set 500 comprises a fixed length codeword area 510 and a fixed-length data set information table (DSIT) area 520. Each data set is identified by a running number allocated consecutively starting with zero. Within each data set the bytes are identified by a running number from 0 to 404,351 and the codewords are arranged in the data set from left to right, from byte 0. The DSIT is similar in nature to the GIT in the DDS format, one difference being the absence in the DSIT of any reference to a BAT, since there is not BAT (or equivalent) in the present format.

PROCESSED DATA CODEWORDS

As has already been mentioned, where possible, data is processed using a DC algorithm. In accordance with the present embodiment, the algorithm is based on the LZ-1 sliding dictionary compression algorithm, known as ALDC-2. The ALDC-2 algorithm encodes byte-wide data through the use of a 1024-byte history buffer and outputs a sequence of data codewords representing either single bytes (literals) or references to strings of bytes in the history buffer.

ALDC-2 is well-known ECMA (ECMA-222) and QIC (QIC-154) standard, and is not described in detail herein. The LZ-1 method is named after A. Lempel and J. Ziv, who derived the method, which is described in detail in the book "Data Compression: methods and theory" by James A. Storer, published by the Computer Science Press in 1988. Other similar methods, known as LZ-2, or codeword dictionary techniques, which are also described in this book, may alternatively be used.

In accordance with the present embodiment, as will be described in detail herein, the encoding scheme utilises a modified version of the ALDC-2 DC algorithm and supports:

an ability to switch between two encoding schemes—one for compressing data (Scheme 1) and one for passing data through uncompressed (Scheme 2); and a number of reserved codewords, which can be included in an encoded data stream to control subsequent decoding functions or identify host computer data separation information, such as FILE MARKs.

MULTIPLE DATA ENCODING SCHEMES

The data encoding algorithm consists of two different encoding schemes, either of which can be selected according to the characteristics of the data being processed. A first scheme, Scheme 1, reduces the redundancy of the data by use of backward references to data in a history buffer, whereas a second scheme, Scheme 2, generally copies the data through without modification. Scheme 2 is provided to protect against data which has little or no redundancy, and which can actually cause expansion in Scheme 1. Such incompressible data may be graphical data, or data which is already compressed.

All data is passed through the history buffer, whichever scheme is in operation. Therefore, after a change from Scheme 2 to Scheme 1, it is possible to use Scheme 1 backward references to data in the history buffer that was received and processed using Scheme 2. It is as if the data output in Scheme 2 had been output as literals in Scheme 1.

The history buffer does not have to be reset when changing between schemes unless there is another reason to do so, such as at an Access Point (which is described below), or possibly when appending further data. A reset will typically cause a potential short term reduction of compression ratio, as the history buffer will need to 're-fill' to provide meaningful backward references.

SCHEME 1 DATA CODEWORDS

In accordance with the present embodiment, Scheme 1 is used to compress data and outputs three-types of data codeword as follows:

literals—a 9 bit codeword consisting of a '0' followed by the (or a copy of the) 8-bit byte being encoded;

backward references—a variable length codeword consisting of a '1' followed by a variable length 2 to 12-bit match count field denoting the match length in bytes, followed by a 10-bit displacement field denoting the location of the start of the backward reference in the history buffer. Thus, a backward reference codeword can be in the range 13 to 23-bits long; and Scheme 1 reserved codewords—13-bit long codewords always beginning with the root codeword 1.1111.11112 and ending in a 4-bit field, which identifies the reserved codeword, as shown in FIG. 6. The sixteen possible reserved codewords are not valid backward references (as shown in FIG. 12), and so cannot be confused with backward references.

SCHEME 2 DATA CODEWORDS

In accordance with the present embodiment, Scheme 2 outputs three types of data codeword:

unencoded literals—for 8-bit data values in the range 0x00 to 0xFE, an 8-bit data codeword is output, which is a copy of the (or the actual) 8-bit input;

encoded literal—for the 8-bit data value 0xFF, the 9-bit codeword 1111.1111.02 is output; and Scheme 2 reserved codewords—13 bit long codewords always beginning with the root codeword 1111.1111.12 and ending in a 4-bit field, which identifies the reserved codeword, as shown in FIG. 6.

SCHEME 1 BACKWARD REFERENCES

As Record data is received, each byte is compared with all bytes in the history buffer for a matching byte. Any matches are treated as a potential backward reference. If a match occurs, the next received byte is compared with the byte following each potential backward reference. If there is a match, then a backward reference for two bytes has been discovered. This continues until no match, or a mis-match, occurs. The longest matching string of bytes prior to the mis-match is then used as the backward reference, defined by match count and displacement fields, which is output into the compressed, encoded data stream. The match count fields are encoded as 2, 4, 6, 8 or 12 bit fields, as shown in the table in FIG. 12, in such a way as to prevent the shorter match fields being misinterpreted as the beginning of the longer match fields.

RESERVED CODEWORDS

As stated, both Scheme 1 and Scheme 2 output a number of 13-bit reserved codewords in which the first 9-bits are is and the following 4-bits are a value representative of one of the reserved codewords defined hereafter. For convenience, the same 13-bit reserved codewords are used for both schemes, although there is no reason why this should be the case.

Reserved codewords are inserted into the encoded data stream by the tape drive during the data encoding process to control the operation of the decoding process, and also to encode data separation information, such as FILE MARKs.

Reserved codewords are not, however, passed into the history buffer during encoding or decoding.

Since, unlike in the DDS format, there is no separate index (e.g. a BAT) which indicates where Records or FILE MARKs begin and end, the format according to the present embodiment provides an alternative mechanism for enabling data appending or locating operations within the encoded data stream.

The mechanism relies on specific, defined parts of the encoded data stream occurring at predetermined positions called append points. To facilitate this, the encoded data stream, from the beginning of the data transfer from the host computer, is logically partitioned into 32-bit words, and append points are always aligned with, or flushed to, a 32-bit word boundary. The 32-bit length of a word is a convenient number, being a power of two, but there is no reason in principle why a word could not be defined to be any other length.

Additionally, a history buffer mis-match is forced at an append point so that the append point does not become embedded in a backward reference. In effect, the longest matching string of bytes found prior to the append point is output, regardless of whether the matching string may extend beyond the append point.

The existence of an append point is determined by any one of the reserved codewords that has a 'flush' requirement, as shown in FIG. 6, namely: FILE MARK, EOR, Flush and End Marker codewords. To effect alignment with a word boundary, the space in the encoded data stream, if any, between any one of these reserved codewords (apart form the End Marker) and the next word boundary are 'bit-packed', or padded, with 0s. The space, if any, between the End Marker and the next boundary is bit-packed with 1s.

In practice, the codewords in the encoded data stream are 'bit-packed', as required for both Scheme 1 and Scheme 2, into 32-bit words for storage in the codeword area 510 of each data set, with the bit order reversed such that the most significant bits are output or encountered first during decoding.

Now follows a more detailed explanation of each reserved codeword.

Reset 1

Whenever a Reset 1 codeword is encountered, the history buffer is reset (that is to say, subsequent data is put at the start of the buffer), and all data codewords which follow are Scheme 1 data codewords. This applies until either a Reset 2 or Scheme 2 codeword is encountered.

A Reset 1 codeword may occur either inside or outside of a Record, since the basis for deciding whether to apply Scheme 1 or Scheme 2 is entirely depended on achieved (or achievable) compression ratio and is independent of the structure of the incoming data. Although the codeword does not have a flush requirement, when it occurs outside of a Record, it will always begin on a 32-bit boundary, following an EOR codeword, and will always be followed immediately by a Flush codeword, so that the next Record or FILE MARK will begin on a word boundary.

A Reset 1 codeword may occur as the first codeword of a Record, in which case it is considered to be inside the Record and need not be followed by a Flush codeword.

Reset 1 codewords are written at Access Points to ensure that decompression can begin at that point without knowledge of previous data. An Access Point is the point in a data set where data decompression can begin; backward references after an Access Point can only refer to data in the history buffer received after that Access Point. Decompression can continue across an Access Point seamlessly, without the need to reference the DSIT.

A Reset 1 will cause a potential, short term reduction of compression ratio, as the history buffer needs to re-grow.

Reset 2

Whenever a Reset 2 codeword is encountered, the history buffer is reset (that is to say, subsequent data is put at the start of the buffer), and all data codewords which follow are Scheme 2 data codewords. This applies until either a Reset 1 or Scheme 1 codeword is encountered.

In all other ways, Reset 2 codewords are treated in the same as Reset 1 codewords.

Scheme 1

A Scheme 1 codeword indicates that all data codewords which follow are Scheme 1 data codewords, and this applies until either a Reset 2 or Scheme 2 codeword is encountered. A Scheme 1 codeword can occur both inside and outside of a Record.

Although the codeword does not have a flush requirement, when it occurs outside of a Record, it will always begin on a 32-bit boundary, following an EOR codeword, and will always be followed immediately by a Flush codeword, so that the next Record or FILE MARK will begin on a word boundary.

A Scheme 1 codeword may be output as the first codeword of a Record, in which case it is considered to be inside the Record and need not be followed by a Flush codeword.

Scheme 2

A Scheme 2 codeword indicates that all data codewords which follow are Scheme 2 data codewords, and this applies until either a Reset 1 or Scheme 1 codeword is encountered. In all other ways, it is has the same effect as a Scheme 1 codeword.

FILE MARK

A FILE MARK codeword represents a Write FILE MARK command and therefore can never occur within a Record. A FILE MARK codeword always begins on a 32-bit boundary, since it will always be located: at the start of a data transfer; after a Record; or after another FILE MARK. Since the FILE MARK codeword has a respective flush requirement, by default it can be treated as the 32-bit constant: 1.1111.1111.0100+000.0000.0000.0000.00002= FF980000h.

EOR

An EOR codeword is the last codeword of a Record, and therefore can never occur outside of a Record. Following this codeword will be from zero to thirty-one 0s, to pad to the next 32-bit word boundary.

Flush

A Flush codeword, causes the next codeword to start on the next 32-bit boundary and, similar to an EOR codeword, is followed by zero to thirty-one 0s, to pad to the next 32-bit word boundary. A Flush codeword may be used either inside or outside of a Record; inside to force a mid-Record codeword to line up with a 32-bit boundary, and outside to follow immediately after Scheme X and Reset X codewords, thereby assuring that any following Record (or part Record), FILE MARK and End Marker codewords begin on a 32-bit boundary.

As already indicated, Flush codewords can be used outside of a Record to support Reset X and Scheme X codewords. As such, these codewords can also be treated as 32-bit constants:

'Reset 1→Flush'=1.1111.1111.0000+1.1111.1111.0110+ 0000002=FFC00h

'Reset 2→Flush'=1.1111.1111.0001+1.1111.1111.0110+ 0000002=B7FC00h

'Scheme 1→Flush'=1.1111.1111.0010+ 1.1111.1111.0110+0000002=FF8FFC00h

'Scheme 2→Flush'=1.1111.1111.0011+ 1.1111.1111.0110+0000002=FF97FC00h

In these cases, Flush codewords always begin on the 14th bit of a 32-bit word.

Hitherto, for example in the DDS format, it has been known to provide the ability to append ter Records or FILE MARKs, or at the end of data. The flush codeword of the present format provides the further ability to generate an append point and any arbitrary position inside of a record. Examples of when this facility can be very useful is given below.

End Marker

An End Marker codeword indicates that any data following it within a data set has no meaning (though it may still covered by any error detection and correction redundancy) and is used to stop decompression for the remainder of the data set in which it is encountered. An End Marker codeword will only ever be written after an EOR and thus always begins on a 32-bit boundary.

Since an End Marker codeword begins at a 32 bit boundary and is padded (with 1s) to the next 32-bit boundary, it can be treated as the 32-bit constant '1.1111.111.1111+ 111.1111.1111.1111.11112'=FFFFFFFFh.

ACCESS POINTS

Access points are used to designate a position at which the history buffer is reset and at which decompression of data in a data set can begin. In accordance with the present embodiment, there is, at most, one Access Point per data-set, the location of which is registered in the DSIT. In order to access any Record or FILE MARK in the encoded data, decoding must begin from an Access Point in the stream before the Record or FILE MARK and continue until the target is reached.

Specifically, an Access Point is defined to be at the beginning of the first data set in a data transfer or, thereafter, at the start of a subsequent data set or immediately following the end of any Record spanning into a data set from a previous data set. If a Record spanning into a data set is so long that it also spans into the next data set, then there is no valid Access Point, and the content of the Access Point field in the DSIT is set to FFFFFFFFh to indicate this.

At an Access Point, the history buffer is reset, and one of the codewords (Reset 1 or Reset 2) precedes any Record data, ensuring that the encoding scheme is defined before any data is written or encountered. This allows FILE MARK codewords to be written at an Access Point before the encoding scheme is defined. The appropriate reset codeword is used, depending on which processing scheme is required from that point.

At an Access Point there must be one of:

Reset X followed by Flush;

Reset X followed by Record data;

End Marker; or

FILE MARK followed by any of the above.

The history buffer 'reset' at an Access Point prevents backward references being output, which refer to data input before the Access Point. Thus, compression and decompression must always begin at an Access Point.

DATA SET FILLING

If only a part of a data set is filled with codewords, and it is necessary to write the data set to tape, then the data set is 'completed' before further processing steps occur. In such a case, if a Record is not complete it is terminated with an EOR codeword. The last valid codeword is then an End Marker codeword, unless that position is coincident with the DSIT (in which case it is not a partial data set anyway). Optionally, the remainder of the data set can be filled with End Marker codewords.

DATA SET INFORMATION TABLE

The contents of a DSIT are shown in the Table in FIG. 7, and will now be described.

In the Table, the most-significant byte is the lowest-numbered byte position and the least-significant byte is the highest-numbered byte position.

Data Set Number

This 4-byte field is the ordinal number of the data set from the beginning of the tape (BOT), starting with zero.

Valid Data Length

This 4-byte field indicates the number of complete bytes in the data set that are used for processed codewords, up to, but not including, any End Marker that may exist within the data set.

Access Point Offset

This 4-byte field is the byte offset, within the data set, of the Access Point. The count is from the beginning of the DSIT, starting at byte 0. Therefore, if the Access Point were the first byte of the data set, then the Access Point Offset would be Zero. If there is no Access Point within the data set, then this field is set to all ones (that is FFFFFFFFh).

A 'Current Access Point' is defined herein as the Access Point that exists in the present data set, or, if there is no Access Point in a data set, the nearest previous Access Point.

A 'Next Access Point' is defined herein as the first Access Point that occurs in the next or a subsequent data set.

Total Records

This 6-byte field specifies the count of all Records that have been completely processed in all data sets from BOT up to the Current Access Point.

Total FILE MARKs

This 6-byte field specifies the count of all FILE MARKs that have been processed in all data sets from BOT up to the Current Access Point.

Record Count

This 4-byte field specifies the number of Records that exist between the Current Access Point and the Next Access Point. Hence, if a Record starts in a previous data set, and ends in the present one, then that Record is not counted. If there is no Access Point in the current data set, then there are no Records starting or ending within this data set, and so the Record Count is the same as the Record Count in the DSIT of the previous data set. If a Record starts in the present data set, but is not completed until a subsequent data set, then it is counted. Hence, it is not possible to have an Access Point within a data set, and also to have a Record Count of Zero. Also, in accordance with the present embodiment, FILE MARKs are not counted as Records.

FILE MARK Count

This 4-byte field specifies the number of FILE MARKs written between the Current Access Point and the Next Access Point.

Partial Record Length

This 4-byte field specifies how many bytes of data are in the last Record of the current data set, if the Record does not end in the data set. Otherwise, the value is zero.

The remaining DSIT fields, from bytes 36 to 468 are either for vendor-specific information or for tape usage information, and do not relate to the present invention. The remaining DSIT fields will thus not be described further detail herein.

TAPE DRIVE ARCHITECTURE

Figure 8:
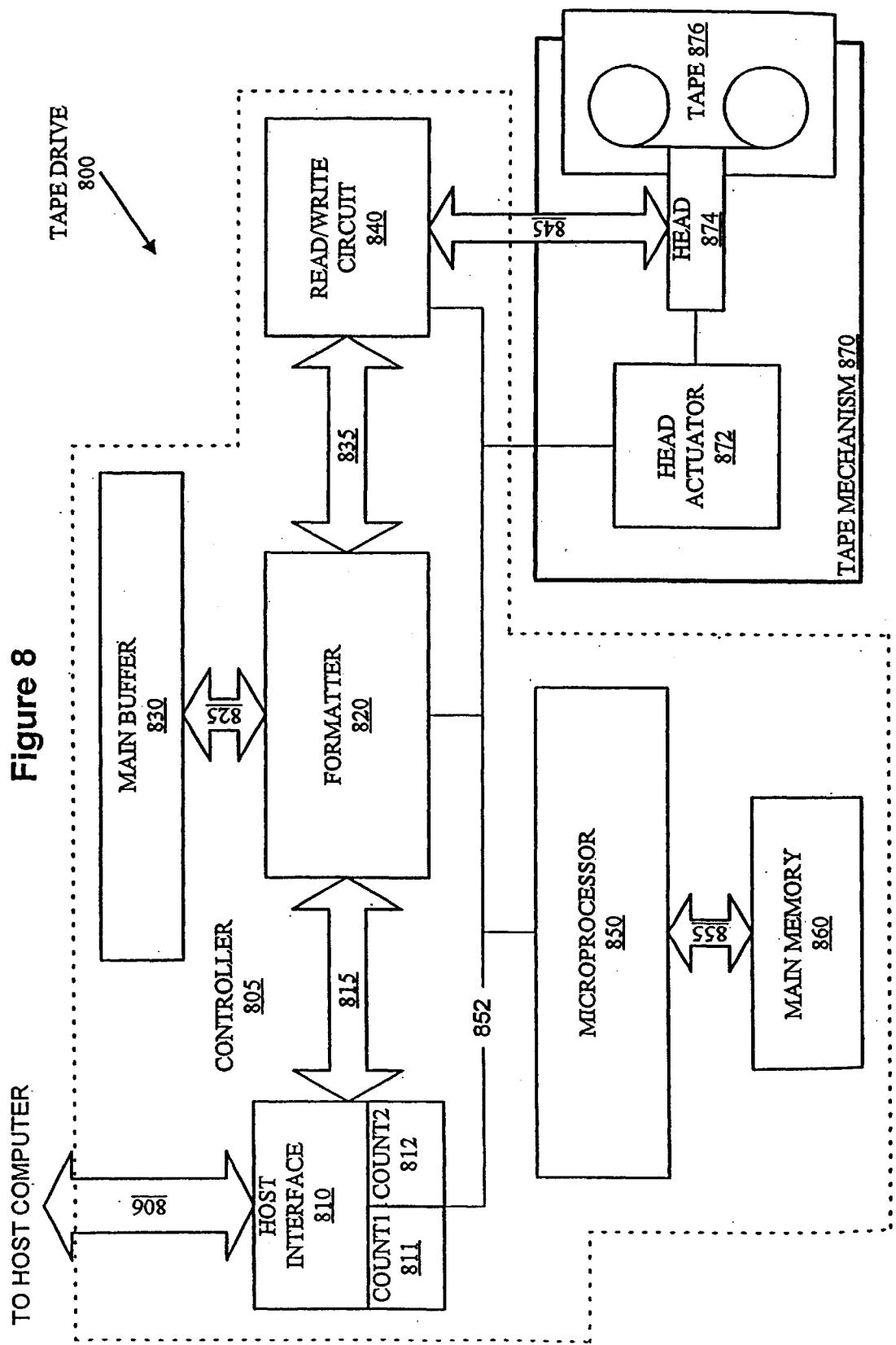
FIG. 8 is a block diagram representation of a tape drive architecture for formatting data in accordance with an embodiment of the present invention.

An exemplary architecture for a tape drive, for storing and recovering data to and from tape in accordance with the present embodiment, is illustrated in the diagram in FIG. 8.

Referring to FIG. 8, a tape drive 800 is connected via a SCSI bus 806 to a host computer (not shown). It is assumed herein that the host computer has loaded therein appropriate 'application' and 'driver' software and hardware with which it can communicate with the tape drive 800 in an appropriate manner.

In a 'write' operation, the tape drive 800 receives data to be backed-up to tape 876 from the host computer and in a 'read' operation the tape drive 800 sends data retrieved from tape 876 back to the host computer. In the embodiment described herein, the SCSI bus 806 connects the tape drive 800 to the host computer. It will, however, be appreciated that any one of a number of other common interface types could be used.

The tape drive 800 described herein is arranged to store and retrieve data in accordance with the format described above. In FIG. 8, the tape drive 800 comprises a tape mechanism 870, and all the other components form what will generally be referred to herein as a 'controller' 805.

The controller 805 includes a series of ASICs (Application Specific Integrated Circuits) each arranged to carry out specific data processing operations. The ASICs are: a host interface 810, for managing the transfer of data between the host computer and the tape drive 800 across the SCSI bus 806; a formatter 820, connected to the host interface 810 by a first data bus 815; and a read/write circuit 840 connected to the formatter 820 by a second data bus 835. Also included is a main buffer 830, for storing therein data in data set form, which is connected to the formatter 820 by a memory bus 825. The main buffer 830 comprises a block of DRAM (Dynamic Random Access Memory) which is sufficient in size to store therein at least one data set.

Figure 9:
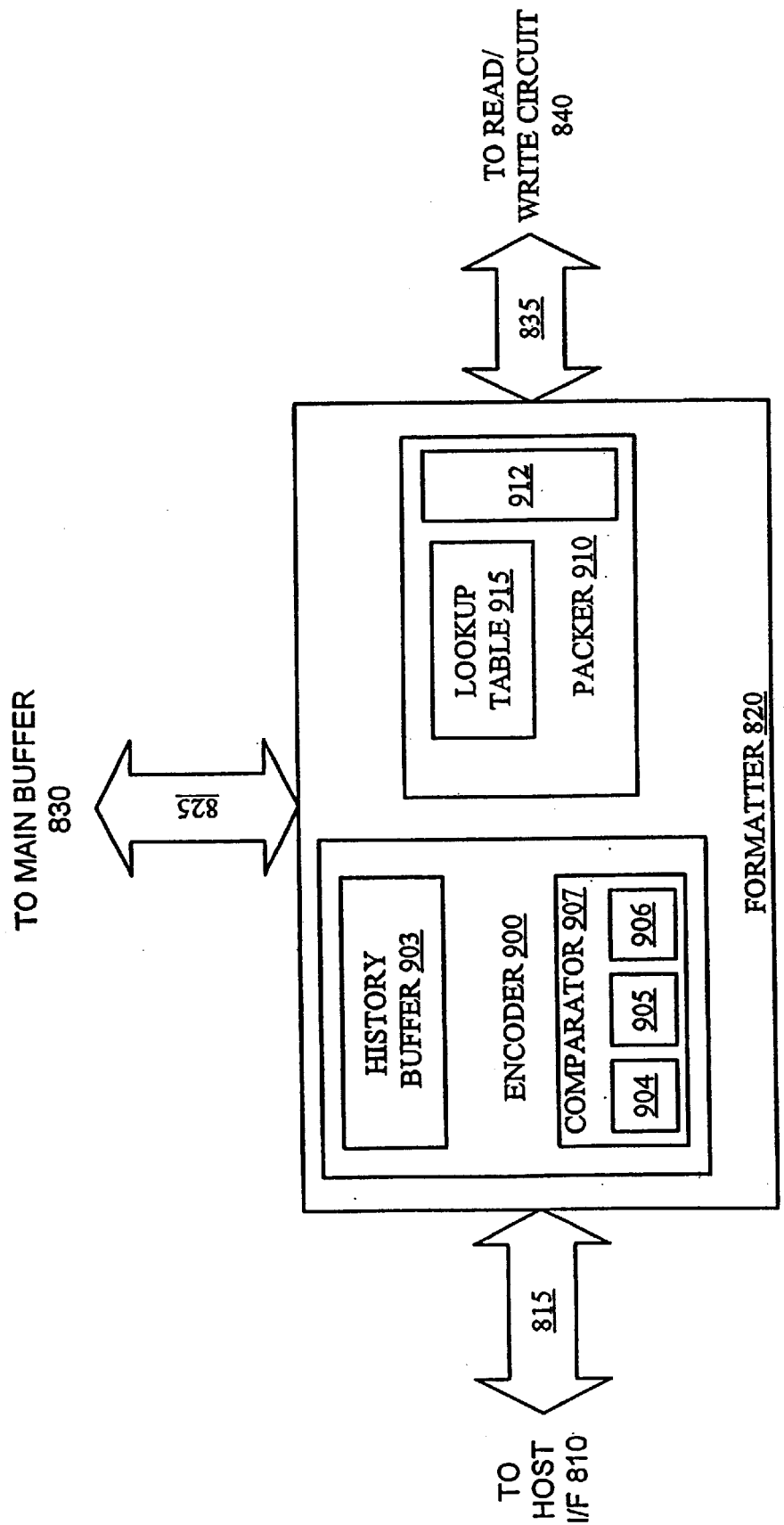
FIG. 9 is a block diagram representation of the major parts of a formatter which formats data in accordance with an embodiment of the present invention.

The main elements of the formatter 820 are illustrated in more detail in the diagram in FIG. 9. As shown, the formatter 820 comprises: an encoder 900 for encoding received host computer data bytes as Scheme X codewords, the encoder incorporating a history buffer 903 and a comparator 907 for determining whether the encoder 900 should apply Scheme 1 or Scheme 2 codewords to the host computer data; and a packer 910 for arranging codewords into an encoded data stream in terms of 32-bit word boundaries, the packer incorporating a lookup table 915 used by the packer 910 to interpret which codewords are reserved codewords and which reserved codewords have a respective flush requirement.

The controller 805 further comprises a microprocessor 850, for example a Motorola 68000 series microprocessor, and main memory 860, which may be ROM (Read Only Memory) or EEPROM (Electrically Erasable Programmable Read Only Memory), accessible by the microprocessor 850. The microprocessor 850 is controlled by firmware instructions stored in the main memory 860 to control all elements of the drive 805, as will be described. The microprocessor 850 is connected to the other elements of the tape drive via a system bus 852 and controls the overall operation of each element of the tape drive 800.

The first data bus 815, for transferring data between the host interface 810 and the formatter 820, comprises a 16-bit data channel and 2-bit control channel. The second and third data buses, labelled 835 and 845 respectively, comprise 16-bit data channels. The actual widths of the data channels are not important, notwithstanding that wider channels, which can carry more bits in parallel, can provide a faster processing pipeline.

Figure 1A:
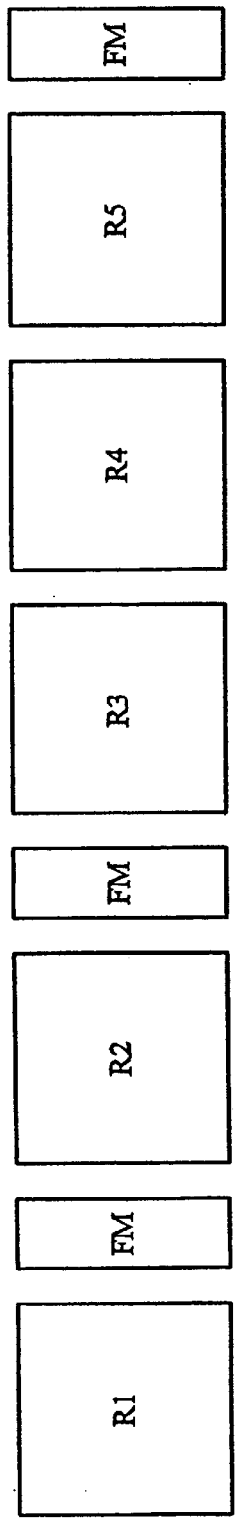
FIG. 1a is a diagram which illustrates the general form of host computer data from a host computer.
Figure 1B:
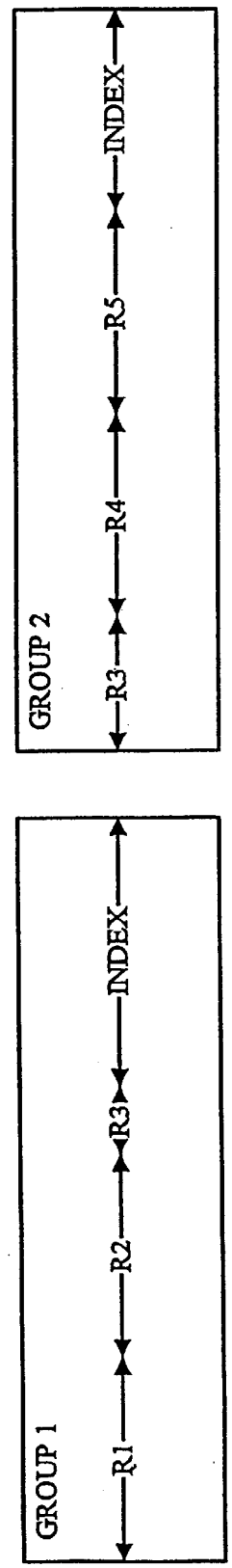
FIG. 1b is a diagram which illustrates grouping of the host computer data of FIG. 1a in accordance with a prior art technique for formatting host computer data.
Figure 3A:
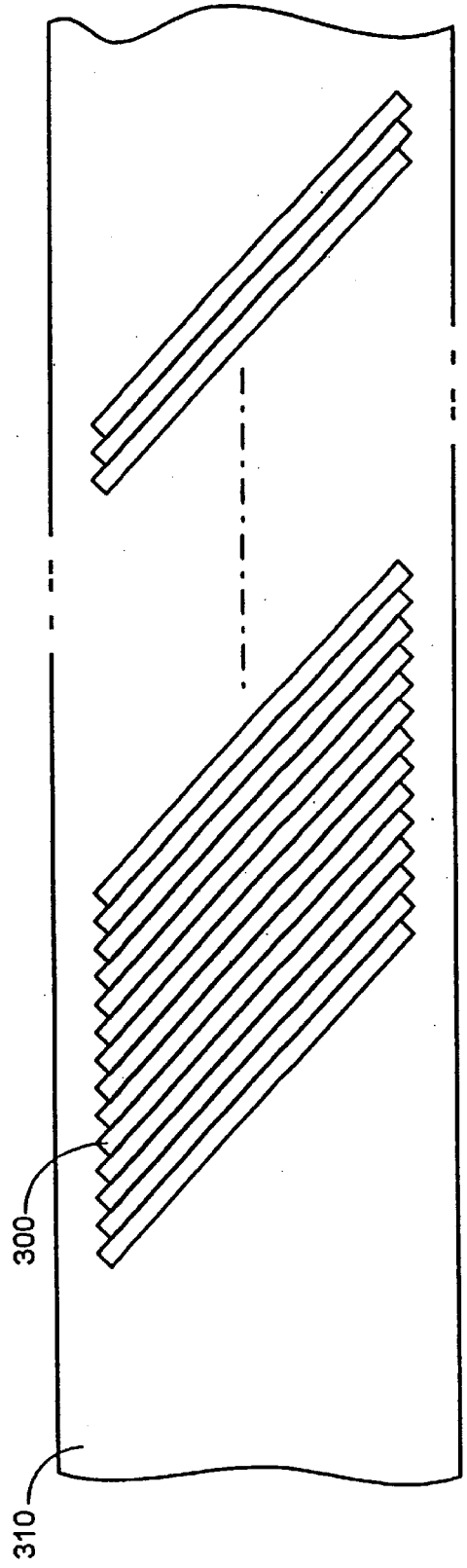
FIGS. 3a and 3b are diagrams which illustrates two common formats by which data can be written to tape.
Figure 3B:
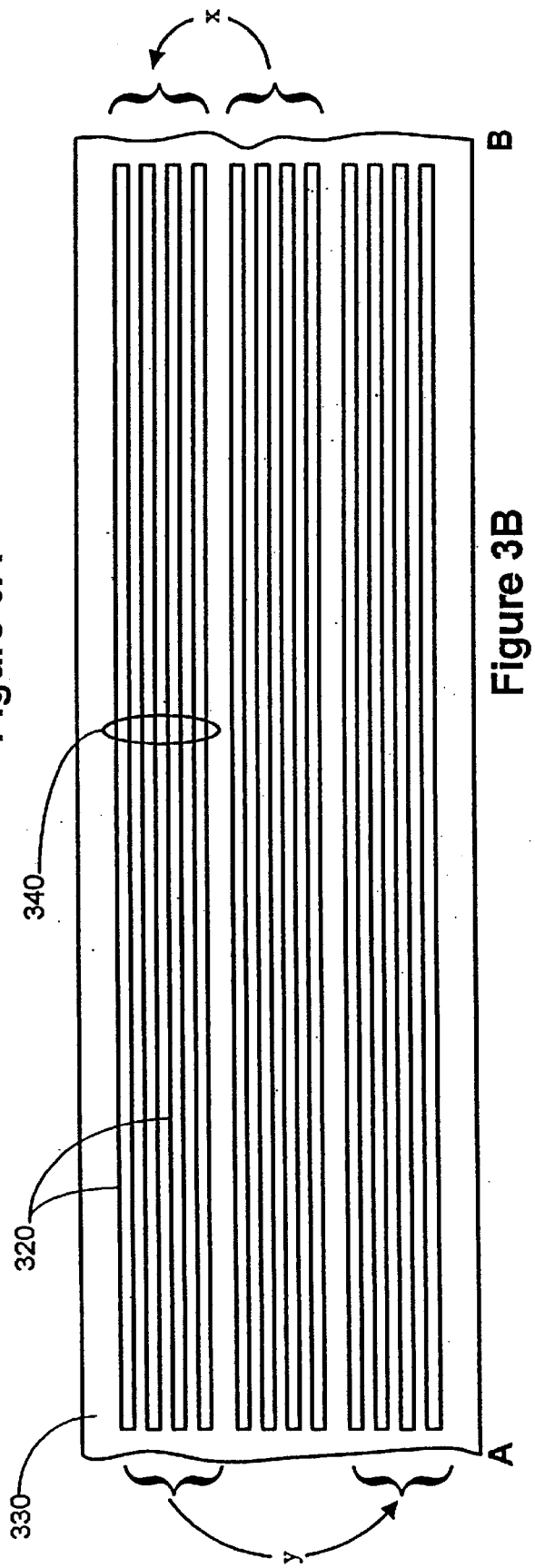

The tape mechanism 870 includes: a read/write head 874 connected to the read/write circuit 840 by a third data bus 845; and a head actuator 833 for controlling the movement of the head 874. FIGS. 3a and 3b illustrate two common ways in which data may be written to tape.

In FIG. 3a, the data is written as a series of oblique tracks 300 along the length of the tape 310, from one end to the other. This type of data storage is generally known as helical scan, and relies on a tape drive which has a rotating drum comprising, typically, four heads; two for reading and two for writing. Such tape drives are well known and form the basis for the DDS data storage standards mentioned above.

FIG. 3b illustrates data written as a series of parallel channels 320 along the length of the tape 330. This technique is commonly known as linear data recording. In the diagram, a group of four (or possibly more) parallel channels, which together are known as a track 340, are written by a static, multi-channel head from one end A of the tape to the other end B. When the head has written data to the end B of the tape, it offsets by x and the tape is rewound so that data can be written in the reverse direction, back to the other end A of the tape. This process can continues, as long as data is received, until the whole width of the tape has been used.

Either of the above-mentioned techniques could be used to write to tape data encoded in accordance with the present embodiment, which is not specific to any particular technique. The data format is, however, expected to be particularly advantageous when directed to linear tape recording techniques.

TAPE DRIVE OPERATION

In the tape drive 800, the host interface 810 receives data from the host computer via the SCSI bus 806 in accordance with the underlying SCSI protocol. If the data is control data (for example load, unload or space), the host interface 810 passes the data to the microprocessor 850, and the microprocessor controls the tape drive 800 to operate accordingly.

For a write data operation, if the data is Record data to be stored to tape, the host interface 810 transmits the data to the formatter 820 to be encoded, and compressed where possible, into an encoded data stream. The encoder 900 interacts with the history buffer 903 and the comparator 907 for the purposes of encoding and compressing the bytes of Record data. The packer 910 'bit-packs' the codewords in the stream as necessary in accordance with any respective flush requirements. The lookup table 915 contains information relating to the reserved codewords, which enables the packer 910 to recognise the reserved codewords provided by the encoder in the data stream and pack them appropriately. The encoded and packed data is transferred to the main buffer 830.

The formatter 820 may also apply error correction/detection coding, the details of which are beyond the scope of the present description, prior to sending the data to the read/write circuit 840.

When appropriate, the formatter 820 retrieves the data from the main buffer 830 and transmits it to the read/write circuit 840. The read/write circuit 840 receives the encoded data and converts the data into signals suitable for driving the read/write head(s) 874. The head actuator 872 moves the head 874 in relation to the tape 876, and the tape mechanism 870 moves the tape 876 in relation to the head 874, for the purposes of writing data. As already stated, tape decks including mechanisms suitable for operation in accordance with the present embodiment are generally known in the art of tape storage, and will not therefore be considered in any further detail herein.

For a read operation, the components described above in relation to writing data operate in reverse to read data from tape, remove error detection/correction coding if appropriate, unpack and decode the data recovered from tape 876, and pass the data back to the host computer 810.

The operation of some elements of the controller will now be described in more detail.
HOST INTERFACE For a write operation, the host computer transmits a write commands to the host interface 810 to write either Records or FILE MARKs. Whether or not the tape drive accepts the request is determined by whether the formatter 820 is ready to receive data from the host computer, as will be described. The overall write process is controlled by the microprocessor 850.

On receipt of a write request from the host computer, to write a data Record, the host interface 810 requests permission to send a Record's worth of data to the formatter 820 by sending a request signal to the microprocessor 850. The microprocessor 850 in turn tests the status of the formatter 820. If the status of the formatter 820 allows, since, for example, there is space in the main buffer 830 to receive a whole data Record and the processing of any previously-received data is complete, the microprocessor 850 signals the host interface 810 to start data transfer to the formatter 820. On the other hand, if the status of the formatter 820 indicates that the main buffer is full, or that existing data is still being processed, the request will be denied, or 'held off'. In effect, the microprocessor 850 will not permit the host interface 810 to transmit the Record data until the formatter 820 is ready. When ready, the host interface 810 transfers a Record's worth of data, 16-bits at a time, across the first data bus to the formatter 820.

The protocol for writing a FILE MARK is that the host computer interface 810 signals to the microprocessor 850 that a Write FILE MARK command has been received. In response, the microprocessor 850 signals the formatter 820 to insert a FILE MARK codeword into the encoded data stream after the end of the previous Record (or FILE MARK).

While the present format treats a Record as the smallest chunk of data that can be 'written' to and from the tape drive 800, it will be appreciated that the underlying SCSI protocol, supported by the host interface and the tape drive host interface 810, actually manages data transfer in SCSI-defined chunks, known as 'bursts', which are typically smaller than a Record. Thus, in effect, within each Record, the host computer and tape drive 800 transfer data in terms of bursts. SCSI supports this feature to allow for the possibility of servicing multiple devices at the same time. Burst length is a value which is typically negotiated by the host computer and tape drive 800 (or in general any device which operates under the SCSI protocol) prior to data transfer, and is commonly set at 32-Kbytes or 64-Kbytes. Each burst of data passed by the host computer to the host interface 810 includes 2 bits of parity information, typically added by the sending end of the SCSI bus (e.g. the host bus adaptor of the host computer during a write operation) and checked by the receiving end of the SCSI bus (e.g. the host interface 810 of the tape drive 800 during a write operation). The parity information is used at the receiving end as a simple check on the integrity of the burst data, and is not passed on beyond the host computer interface 810.

The host interface 810 incorporates two byte counters—a burst counter 811 and a Record counter 812—and services the counters as the bytes pass from the host interface 810 to the formatter 820 during Record and burst transfer. The counters (811 and 812) are pre-loaded for each burst or Record respectively with the number of bytes in a burst or Record. The counters (811 and 812) are then decremented as each byte passes out of the host interface 810. By this means, when one of the counts is zero, the host interface 810 determines that the end of a burst or Record has occurred and then generates a respective signal, or 'flag', for the formatter 820.

In accordance with the present embodiment, the end of burst and EOR signals are transmitted to the formatter 820, as 2-bit control signals on the 2-bit control channel of the first data bus 815. In practice, these signals are timed to pass at the same time as the last byte in the burst or Record. In response, the formatter 820 is configured to receive the signals and insert a Flush codeword (for an end of burst) or an EOR codeword (for an EOR) after the last byte of the preceding codeword in the encoded data stream. In the event an end of bust and an EOR are coincident, the EOR takes precedence and the formatter 820 is arranged to only add an EOR codeword.

Thus, the host interface 810 provides, by means of appropriate signals, all information required by the formatter 820 to control the addition of FILE MARK, EOR and Flush codewords to the encoded data stream.

For a read operation, the process is generally the reverse of the write process, except that the host interface 810 controls the timing: that is, the formatter 820 must request permission to send decoded data to the host interface 810, a Record or FILE MARK, at a time, on the basis of whether the host interface 810 and the host computer are ready to receive the data.

One benefit of the ability to add a flush codeword into the encoded data stream will now be described.

Hitherto, tape drives known to the present inventors have employed a buffer, in what constitutes a host interface, large enough to receive one or more whole bursts of data. Each burst of data in the buffer is pre-processed, to check the integrity thereof by reference to the parity information, before the bytes of the burst are forwarded on for data processing such as data compression. If the burst is determined to be 'bad', according to the parity information, the host interface (or equivalent host bus adaptor) requests re-transmission of the burst.

The main reason for this pre-processing check is that once data has entered the data processing stage and has been encoded, and in particular compressed, the 'burst boundaries', which are typically within Records, are 'lost' in the resulting compressed data stream. In this case, a burst boundary may be 'lost', for example, when the last bytes in one burst and the first bytes in the next are represented in the encoded data stream by a single backward reference. Thus, it would be extremely difficult, and tricky in processing terms, to re-send the burst and place it in the correct position in the encoded data stream, if the 'bad' burst data had already been compressed.

The pre-processing is generally recognised as a bottleneck to data processing, which has hitherto been reduced to some extent by employing expensive and fast SRAM as the buffer memory.

The present inventors have addressed the bottleneck problem in a different way, which has obviated to a large extent the need for a buffer in the host interface for pre-processing.

The mechanism for overcoming the stated problem is enabled by using the Flush codeword to identify the end of a burst in the encoded data stream. As has already been described, the Flush codeword can be used to line up any arbitrary point in the host computer data stream with a word boundary in the encoded data stream. In the present case, the Flush codeword is used at the end of each burst to align the beginning of the next burst with the next 32-bit word boundary in the encoded data stream. Thus, burst boundaries are clearly identifiable, even in a compressed data stream, as the 32-bit boundary following any Flush codeword. Thus, a re-tried, encoded burst can simply be written over the 'bad' encoded data in the respective data set, even when the data has been compressed.

The re-writing of a burst to the correct location in a data set is controlled by the formatter 820, which includes two pointers; a first pointer and a second pointer. The first pointer points to the memory location in the main buffer 830 where the next data byte is to be written, and is incremented each time a byte is written to the main buffer. The second pointer points to the memory location of the 32-bit word boundary, generated by a Flush codeword, preceding the most recent burst of data. The value of the second pointer is updated as each new Flush codeword is written to the main buffer 830.

When the host interface 810 requests a burst retry, via the microprocessor 850, the formatter 820 resets the first pointer to the position of the most recent Access Point, and then reads from the Access Point to the memory location pointed at by the second pointer. Thereafter, the bad burst is over-written by the re-transmitted burst. This process is repeated until the burst is successfully written to the main buffer 820.

Also, when a burst retry is requested, the counters (811 and 812) in the host interface 810 are both incremented by the number of bytes in a burst, in order to accommodate the same bytes passing through again.

Another benefit of this burst retry approach is that the history buffer 903 is reset by default to the same state for writing the re-transmitted burst as it was in for writing the originally-transmitted version of the burst.

Thus, the bytes in a burst can be passed by the host interface 810 to the formatter 820 for compression as they are received. In other words the bottleneck is removed since there is no need to wait to receive the whole burst before forwarding the bytes to the formatter 820. Further, there is no need for a buffer in the host interface 810 which holds one or more whole bursts of data to allow pre-processing.

Parity checking is still required to determine if a burst is 'bad'. The parity check, however, is calculated by the host interface 810 as the bytes pass through the host interface 810, and a resulting parity check figure is compared with the parity information for the burst received from the host computer. In the event any data in the burst is 'bad', the host interface 810 requests the host computer for a burst retry, which is a standard SCSI command.

This principle can be extended for re-positioning to any arbitrary location in the main buffer 830. For example, the host computer can at any time issue the SCSI command 'save pointers'. This command may be interpreted by the host interface 810 as a request to insert a Flush codeword into the encoded data stream. If the host computer issues a 'save pointers' command before each burst of data, the host interface 810 could interpret this as a request to add a Flush codeword, thereby obviating the burst counter 811.

FORMATTER

Figure 10:
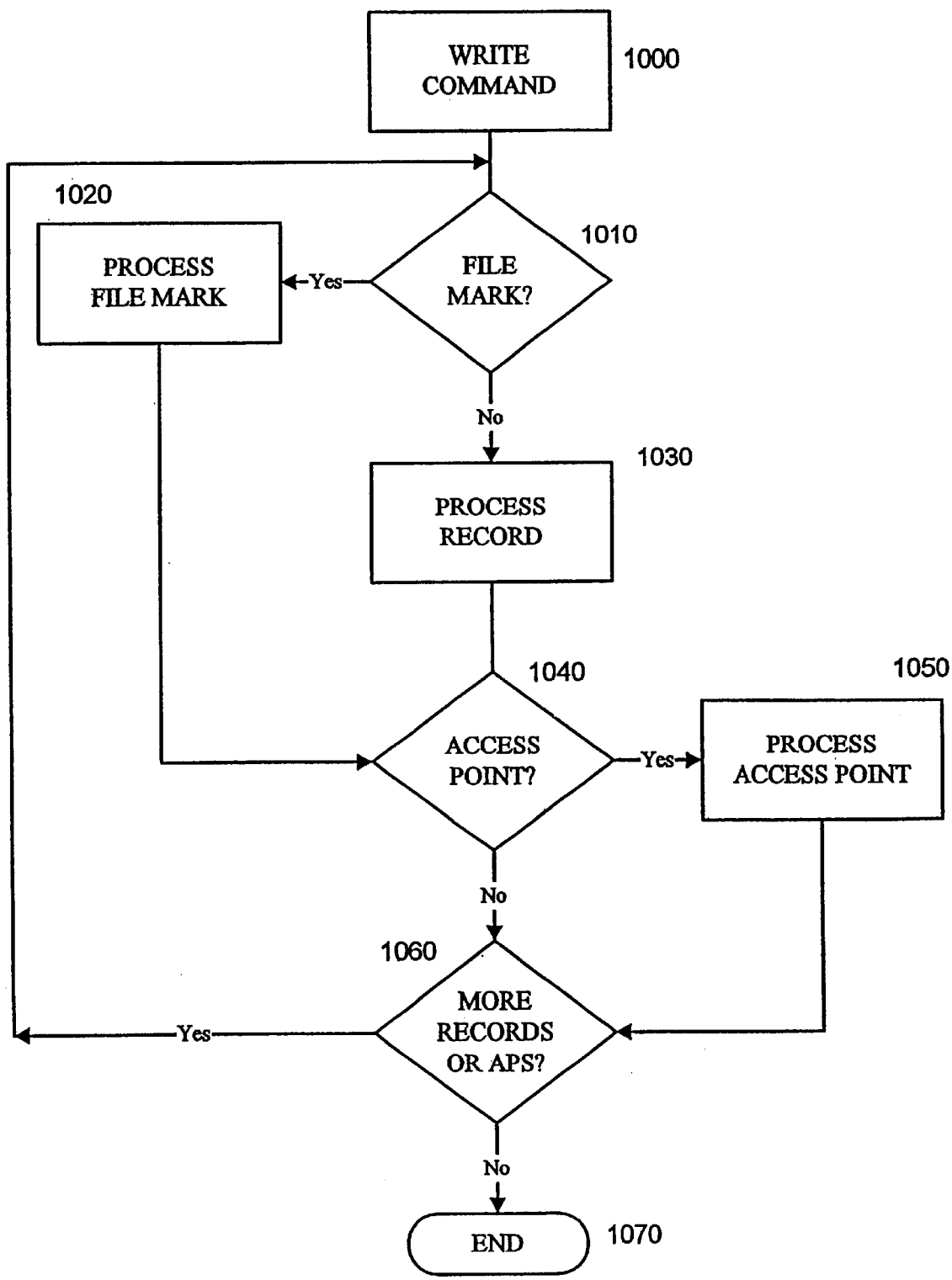
FIG. 10 is a flow diagram which illustrates the steps involved in encoding data in accordance with an embodiment of the present invention.

The operation of the formatter 820 will now be described in more detail with reference to the flow diagram in FIG. 10, in terms of a write operation.

In the flow diagram, a write process starts in step 1000 after the tape drive 800 receives a write command from the host computer, and the microprocessor 850 has initialised the tape drive for a write operation. In step 1010, if the write command is a 'Write FILE MARK', and the formatter 820 is ready, the host interface 810 sends a FILE MARK signal to the microprocessor 850, which in turn signals to the formatter 820, in step 1020, to output a FILE MARK codeword.

If the write command is to write a Record, and the formatter 820 is ready, the formatter 820 receives Record data from the host interface 810 and the encoder 900 applies Scheme X encoding on a per byte basis, in step 1030, where X can be 1 or 2 depending on certain criteria, which will be described below.

Irrespective of which scheme is in operation, all byte data passes through the history buffer 903. Thus, in the case of Scheme 1, the encoder 900 outputs codeword data by reference, where possible, to codewords existing in the history buffer 903. In the case of Scheme 2, the encoder 900 has a pass-through mode whereby byte values which are received by the encoder 900 are simply passed through and out of the encoder. Even though the data is passed through without any processing being carried out on it, each byte is still referred to herein as a codeword in the encoded data stream.

As has already been described, burst processing is achieved by inserting a Flush codeword into the encoded data stream after the last byte of a burst, when the formatter 820 receives a Flush point signal from the host interface 810. Also, an EOR codeword is added to the encoded data stream after the last codeword of the Record, in response to an EOR signal from the host interface 810.

After the codewords for each Record or FILE MARK have been written, the next step, step 1040, is to determine whether an Access Point is required. An Access Point is required, as soon after the start of a new data set as possible. This will in practice be at the beginning of a data set, or after the end of the first part-Record (if the Record started in a previous data set) in a data set. When an Access Point is required, then, in step 1050, the formatter 820 'holds-off' further data from the host interface 810, after outputting the respective EOR codeword, until any remaining data in the packer 910 has passed to the main buffer 830. Then, the formatter 820 registers the Access Point position (the byte offset from the beginning of the current data set) in the DSIT for the current data set held in the main buffer 830. Thereafter, the formatter 820 outputs the appropriate Reset X codeword and then continues receiving data bytes from the host computer interface 810.

Finally, in step 1060, the process iterates to step 1010 to process any further Records or FILE MARKs, or the process ends in step 1070.

The DSIT values for a data set are generated by the formatter 820 on the basis of the signals received from the host interface 810: in particular the EOR and FILE MARK signals.

The passing of data from the main buffer 830 to the read/write circuit is controlled by microprocessor 850 on a per data set basis. In other words, the microprocessor will not initiate data transfer from the main buffer 830 to tape until at least one data set is complete. Conversely, when reading data from tape, the microprocessor 850 will not allow the tape drive 800 to read data until there is sufficient room in the main buffer 830 for one whole data set.

With regard to which encoding scheme is in operation at any time, the formatter 820 includes monitoring functionality in the form of a comparator 907 to monitor the compression ratio of data encoded using Scheme 1. The comparator 907 includes two counters; a first counter 904, which increments each time a byte is passed into the encoder; and a second counter 905, which increments in line with the number of compressed bits that are (in Scheme 1), or would be (i.e. backward references in Scheme 2) output from the encoder 900. The comparator also includes a division circuit 906, which calculates the ratio of the value of the second counter 905 over the value of the first counter 906 at a given time. Obviously, before dividing, it is necessary to multiply the number of bytes input by eight, to give the equivalent number of bits input, to provide a correct ratio. This ratio is representative of the average (real or potential) compression ratio over a given period. The given period can be measured in terms of the number of bytes input into the encoder 900. For example, the ratio might be calculated for each word's worth of data (i.e. 32-bits), each burst's worth (e.g. 32-Kbytes) of data, each Record's worth of data, or over any other arbitrary period (e.g. after every single byte). Each time the ratio is calculated, the comparator generates a flag indicative of which Scheme should be in operation, and then the counters are reset to begin the next ratio calculation. Clearly there are many other ways of calculating compression ratio.

In a preferred embodiment, if the ratio falls below a first threshold, then the comparator 907 flags a swap from Scheme 1 to Scheme 2. When in Scheme 2, the Scheme 1 encoding is in effect still enabled, as all input data passes through the history buffer 903, and potential compression ratio measurements continue to be made. If the ratio rises above a second threshold, a swap back to Scheme 1 is signalled by the comparator 907. The period and thresholds are configurable, and the first threshold, for a swap from Scheme 1 to scheme 2, can be the same as, or different from, the second threshold, for a swap from Scheme 2 to Scheme 1. The values for the period and thresholds, to provide the best overall compression performance, can be determined heuristically. Alternatively, the values may be determined adaptively on the basis of the nature of the data being received. Of course, the adaptive option would require extra functionality to be built into the tape drive 800, which is beyond the scope of the present description.

Thus, when Scheme 1 is in operation (which is the default for the first Record of the first data set, and which is determined by a Reset 1 codeword), if the compression ratio drops below, for example, 1:1, the formatter 820 inserts a Scheme 2 codeword into the encoded data stream. Thereafter, Record bytes received by the formatter 820 are passed through the encoder 900 without being encoded.

The monitoring of the compression ratio continues during Scheme 2 operation. If the compression ratio is seen to rise above, for example, 1.5:1 (that is to say, there is an element of hysteresis between the Scheme 1 and 2 switching levels), the encoder 900 inserts a Scheme 1 codeword, and subsequent Record data bytes are output using Scheme 1 encoding.

During encoding, the addition of Scheme X codewords has no effect on the history buffer 903, and the history buffer is not reset. This means that after a switch from Scheme 2 to Scheme 1, the full history buffer contents are available for use as potential backward references.

The operation of the formatter 820 for a read operation is the opposite of the write operation, with data decompression being applied to the encoded data by the encoder 900 (acting as a decoder), instead of compression, in known fashion. In some embodiments, it may be preferred to include a decoder that is separate from the encoder 900, although it will be appreciated that such a decision is a matter of design choice.

In the present embodiment, decompression is more straight forward than compression, since compression ratio monitoring is not required; decompression simply follows the Scheme X and Reset X codewords which are received by the formatter 820. Apart from the reserved codewords, the data codewords are simply decoded by applying the respective decompression algorithm, which is well known.

During decoding, reserved codewords are detected, removed from the data stream, and acted upon where necessary by the encoder 900 (acting as a decoder). FILE MARK codewords detected by the encoder 900 cause the formatter 820 to signal to the host interface 810, via the microprocessor 850, that a FILE MARK should be transmitted back to the host computer. None of the other reserved codewords have any meaning as far as the host computer is concerned, so they are simply removed from the data stream. However, the Scheme X and Reset X codewords cause the formatter 820 to decode the encoded data and reset the history buffer respectively.

Figure 11:
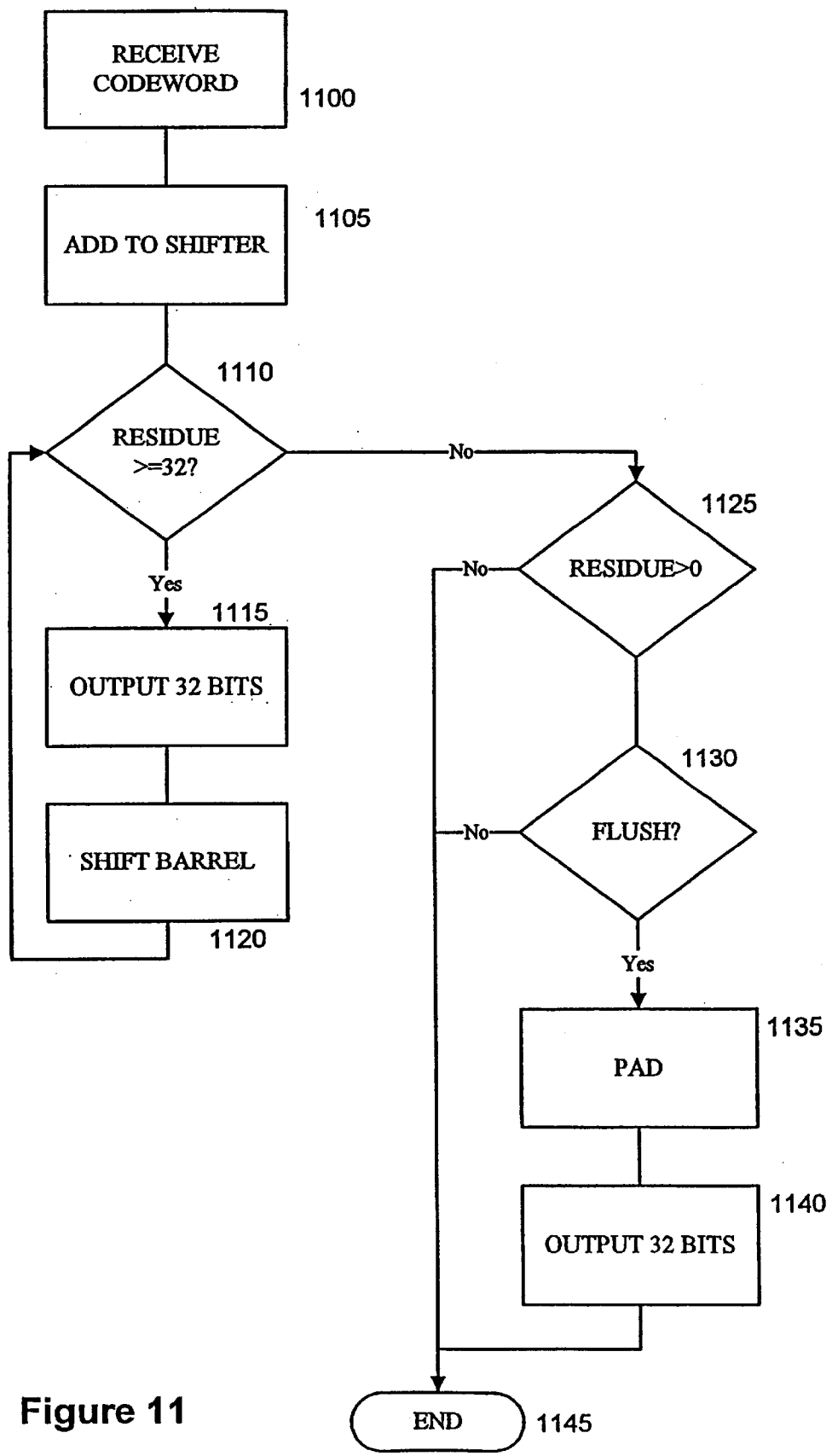
FIG. 11 is a flow diagram which illustrates the steps involved in packing data encoded in accordance with an embodiment of the present invention.

The operation of the packer 910 will now be described in more detail with reference to the flow diagram in FIG. 11.

The packer 910 operates on codeword data resulting from the encoder 900. Data is passed to the packer 910, in step 1100, a codeword at a time. As each codeword is received, the packer 920 refers to the lookup table 915 to determine whether the codeword is a reserved codeword that has an associated Flush to word boundary requirement. The lookup table 915 contains for each reserved codeword an entry, which indicates whether there is a flush requirement and whether the padding for the codeword uses 1s or 0s. The entries in the lookup table 915 are also used during decoding to determine which codewords are reserved codewords, and how the reserved codewords should be processed.

In step 1105, the received codeword data is passed to a 'barrel shifter' function 912 in the packer 910, which is similar in operation to a FIFO register, which in effect operates to receive a stream of data bits into a notional 'top end' thereof, pass the bits through to a notional 'bottom' end thereof, and output in parallel from a notional 'side' thereof 32-bit wide data words. In accordance with the present embodiment, the bits are necessarily output from the 'side' as two blocks of 16 bits, since the data bus is only 16-bits wide.

The barrel shifter function 912 operates as follows. In step 1110, if the addition of the codeword data increases the number of bits already in the barrel shifter (if indeed there were already any bits therein) to 32-bits or more, then, in step 1115, the shifter shifts the bottom-most 32-bits out to the current data set in the main buffer 830. Then, in step 1120, the remaining bits in the barrel shifter (if there are any bits remaining) are shifted down (by 32-bits) to the bottom of the barrel shifter. The process then iterates back to step 1110, where there is a further check on the number of bits in the shifter.

If there are fewer than 32-bits in the shifter, then, in step 1125 the packer checks whether there are any bits at all remaining in the shifter. In there are no bits remaining, then the packer process ends in step 1145. If there are any bits remaining then, in step 1130, the flush to word boundary requirement is assessed, on the basis of whether the packer 910 detected by reference to the lookup table 915 the presence of a reserved codeword having a flush requirement. If there is a flush requirement, then, in step 1135, the barrel shifter is filled, or 'padded', with either zeros or ones, depending on the flush requirement, from after the last-received codeword bit in the shifter and up to a 32-bit threshold. Next, in step 1140, the shifter shifts the 32-bits out to the data set in the main buffer 830. Finally, in step 1145, the process ends for the received codeword data.

In this way, the packer 826 controls the transfer of encoded data, by default, in terms of 32-bit words, and at the same time controls the bit-padding required for flushing codewords to 32-bit boundaries in each data set.

For a read operation, the packer also acts to 'unpack' the data read from tape. This operation is the reverse of 'packing' in that the packer 920 receives 32-bit words and returns codeword bytes to the encoder 900 (acting now as a decoder). In doing so, the packer 920 (acting as an unpacker) refers to the lookup table 915, detects reserved codewords that have previously been 'packed', and removes any padding, which has previously been added in the packing process. Further, in some embodiments, the packer 910 may be arranged to remove Flush and EOR codewords from the encoded data stream, since the formatter 820 does not need to receive these codewords during the decoding process.

The above text describes in detail one particular embodiment of the invention. The skilled reader will appreciate that the essence of the disclosed invention, which is embodied in the claims, can be usefully applied in many other data storage scenarios. Some examples are: hard disk systems; and optically writable and/or readable disk systems, including DVD-RAM (digital video disk-RAM).

What is claimed is:

1. A method of arranging data received from a data source, the received data including one or more records having record structure determined by the data source, the method including the steps of:

determining, independently of the record structure, an appendable point in the data;

encoding the data from the data source into an encoded data stream;

inserting into the encoded data stream, at the appendable point, data representative of the appendable point; and writing the encoded data stream including the inserted data representative of the appendable point to a storage device or medium.

2. A method according to claim 1, wherein the encoded data stream including the data representative of appendable points is arranged into a series of fixed-length data portions.

3. A method according to claim 2, wherein any remaining or subsequent data received from the data source after the appendable point is encoded and appended to the encoded data stream after the data representative of the appendable point and coincident with the start of the first available fixed-length data portion in said series of fixed-length data portions.

4. A method according to claim 3, wherein the data representative of the appendable point comprises a fixed-length identifier part and a variable length padding part, the variable length padding part being arranged to comprise sufficient bits to fill the space, if any, between the fixed-length identifier part and the appendable point.

5. A method according to claim 1, wherein the data from the data source are received in bursts or packets having a length determined independently of the record structure, and the beginning or end of each burst or packet is determined to be an appendable point.

6. A method according to claim 1, comprising encoding the data from the data source into a stream of data codewords and the data representative of the appendable points comprises a control codeword.

7. A method according to claim 6, further comprising the step of arranging the written data into fixed length data sets, wherein a data set comprises a data area for data codewords and control codewords and a data set information area for storing information, including information relating to the data set.

8. Apparatus for decoding data arranged in accordance with claim 1.

9. An ASIC configured to arrange data in accordance with claim 1.

10. An ASIC configured to decode data arranged in accordance with claim 1.

11. A method of processing bursts of data received in a data transfer from a data source, the method comprising the steps of:
   a) receiving a new burst of data from the data source;
   b) determining whether the new burst of data is good or bad;
   c) encoding the new burst of data into an encoded data stream;
   d) writing the encoded data stream to a storage device or medium starting from a defined appendable point in the storage device or medium;
   e) appending to the encoded data stream data representative of a new appendable point; and
   f) in the event the burst is determined to be bad:
      i) requesting re-transmission of the bad burst;
      ii) receiving the re-transmitted burst of data from the data source; and
      (iii) repeating steps b) to f) including in step d) re-writing the re-transmitted burst from the first-mentioned defined appendable point;
   g) in the event the burst is determined to be good:
      repeating steps a) to f) including in step d) writing the transmitted burst from the new appendable point until the data transfer is complete.

12. Apparatus for arranging data received from a data source, the apparatus comprising:
   an interface for receiving data from the data source and for determining, independently of a record structure of the received data, an appendable point in the data, the data comprising one or more records having a record structure determined by the data source;
   an encoder for encoding the data from the data source into an encoded data stream and for inserting into the encoded data stream at the appendable point data representative of the appendable point, and
   a writer for writing the data stream to a storage device or medium.

13. Apparatus according to claim 12, wherein the encoder is configured for arranging the encoded data stream including the data representative of the appendable point into a series of fixed-length data portions.

14. Apparatus according to claim 13, wherein the encoder is configured for encoding and appending any remaining or subsequent data received from the data source after the appendable point to the encoded data stream after the data representative of the appendable point and coincident with the start of the first available fixed-length data portion in said series of fixed-length data portions.

15. Apparatus according to claim 12, wherein the interface is arranged for receiving the data from the data source in bursts or packets having a length determined independently of the record structure, and for determining that the beginning or end of each burst or packet is an appendable point.

16. Apparatus according to claim 12, wherein the encoder is arranged for encoding the (i) data from the data source into a stream of data codewords and (ii) the data representative of the appendable points into a control codeword.

17. Apparatus according to claim 12 comprising a magnetic tape data storage apparatus.

18. Apparatus arranged for processing bursts of data received in a data transfer from a data source, the apparatus comprising:
   an interface for receiving a new burst of data from the data source, and for determining the integrity of the burst of data and for requesting re-transmission of the burst of new data in the event the burst of new data is determined to be bad; and
   an encoder for (i) encoding the burst of data into an encoded data stream, (ii) writing the encoded data stream with the burst of data to a storage device or medium starting from a defined appendable point in the storage device or medium and (iii) appending to the encoded data stream data representative of a new appendable point, the encoder being arranged for re-writing any re-transmitted burst data from the defined appendable point and any subsequent, new burst data from the new appendable point.

19. Apparatus according to claim 18 comprising a magnetic tape data storage apparatus.

20. A method of formatting host data, including the steps of:
   receiving host data comprising one or more records;
   encoding with codewords the host data to form an encoded data stream;
   during the encoding step, inserting into the encoded data stream a flush codeword to represent an appendable point, the inserting being at specified appendable points, the points being specified independently of the record structure; and
   writing the encoded data stream to memory.

21. A method according to claim 20, wherein the host data as received includes a series of points, and specifying said points as occurring at the beginning or end of each burst.

22. A method according to claim 20, comprising receiving a control signal, the control signal causing an appendable point to be specified at a respective point in the received host data.

23. A method according to claim 20, wherein the host data as received includes a series of points, and specifying said points as occurring between the beginning and end of each burst.

24. A method according to claim 20, wherein the host data as received includes a series of points, and specifying said points as occurring at the beginning and end of each burst.

25. Apparatus for processing bursts of data involved in a data transfer from a data source, the apparatus comprising:

a receiver for a new burst of data from the data source;

a data processor arrangement connected to be responsive to the new burst of data received by the receiver for:
  a) determining whether the new burst of data is good or bad;
  b) encoding the new burst of data into an encoded data stream;
  c) writing the encoded data stream, including the new burst of data, to a storage device or medium starting from a defined appendable point in the storage device or medium;
  d) appending to the encoded data stream, including the new burst of data, data representative of a new appendable point; and
  e) in the event the burst is determined to be bad:
    i) requesting re-transmission of the bad burst;
    ii) receiving the re-transmitted burst of data from the data source; and
    iii) repeating operations (a–e), including in operation c) re-writing the re-transmitted burst from the first-mentioned defined appendable point,
  f) in the event the burst is determined to be good:
    i) activating the receiver to be responsive to another new burst of data;
    ii) causing the data processor to perform operations a)–d) and operation e) if the another new burst of data is determined to be bad; and
    iii) during operation c), writing the transmitted burst from the new appendable point until the data transfer is complete.

26. A method according to claim 25, comprising receiving a control signal, the control signal being a 'save pointers' control signal.

27. Apparatus for arranging data revised from a data source, the data including one or more records having a record structure determined by the data source, comprising:

a data processor arrangement connected to be responsive to the data received from the data source for:
  a) determining, independently of the record structure, an appendable point in the received date;
  b) encoding the received data into an encoded data stream;
  c) inserting into the encoded data stream at the appendable point data representative of the appendable point and a writer for writing the data stream to a storage device or medium.

28. Apparatus for formatting host data, including one or more records comprising:

a data processor arrangement connected to be responsive to the host data for:
  a) encoding with codewords the host data to form an encoded data stream;
  b) inserting, at specified appendable points during encoding, in the encoded data stream a flush codeword representing an appendable point, the points being specified independently of the record structure; and
  c) circuitry for writing the encoded data stream, including the flush codeword, to memory.

* * * * *